United States Patent Office 3,396,184

Patented Aug. 6, 1968

3,396,184

TRIALKYL-DIHALOTANTALUM AND NIOBIUM COMPOUNDS

Gordon L. Juvinall, Monrovia, Calif., assignor to the United States of America as represented by the Administrator of the National Aeronautics and Space Administration No Drawing. Filed July 9, 1965, Ser. No. 470,902
5 Claims. (Cl. 260—429)

ABSTRACT OF THE DISCLOSURE

Novel organo-metallic compounds of the formula $R_3MX_2$ are disclosed. $R_3$ is an alkyl group containing from one to four carbon atoms, M is tantalum or niobium and X is halogen. The compounds are prepared by reacting at low temperature under vacuum in an inert organic solvent, a dialkyl zinc compound with a tantalum or niobium pentahalide and recovering the desired compound. These volatile compounds can be pyrolyzed to deposit a film of metal on a variety of substrates.

ORIGIN OF THE INVENTION

The invention described herein was made in the performance of work under a NASA contract and is subject to the provisions of Section 305 of the National Aeronautics and Space Act of 1958, Public Law 85–568 (72 Stat. 435; 42 U.S.C. 2457).

This invention relates to new metallic compounds useful in metal film deposition. More particularly, this invention relates to new organo-metallic compounds of niobium and tantalum useful for film deposition.

Prior to this invention organo-metallic compounds of Group VA were formed as arene complexes. One of the important reasons for forming the Group VA metal compounds, particularly in the case of niobium and tantalum, was for utilization in metal film deposition processes so as to produce substrates coated with these metals. These particular metals have the property of superconductivity and find utilization in advanced applications in electronic computers and data processors in circuitry involving miniaturization.

An object of this invention is to provide new organometallic derivatives of tantalum and niobium which are capable of adaptation for improved processes in metal film deposition.

Another object of the invention is to provide new organo-metallic compounds of niobium and tantalum which are capable of vaporization to leave the metal film deposited on substrates herebefore unsuitable for this purpose.

The above and other objects of the invention are accomplished by new compounds having the following general formula:

$$R_3MX_2$$

wherein R is an alkyl group of from 1 to 4 carbon atoms; M is a metal selected from the class consisting of tantalum and niobium; and X is a halogen. Thus, it can be seen that the compounds of the invention are sigma bonded alkyl compounds of niobium and tantalum. Preferably, R in the above formula is a methyl group, since the volatility of the compounds will tend to decrease with increased chain length of the alkyl group. Compounds wherein R is a methyl group and the halogen is chlorine are found to possess excellent film deposition characteristics.

Other additional compounds which obviously fall within the above formula and are thus contemplated as part of this invention include trimethyldichlorotantalum, tributyldiodoniobium, tripropyldichlorotantalum, triethyldifluorotantalum and the like.

The compounds of the invention are prepared by a novel reaction involving low temperature exchange of alkyl groups and halogen between dialkylzinc and the pentahalides of niobium and tantalum respectively. For example, one of the preferred compounds of the invention, trimethyldichloroniobium is formed according to the following equation:

$$3(CH_3)_2Zn+2NbCl_5 \rightarrow 2(CH_3)_3NbCl_2+3ZnCl_2$$

Obviously, the tantalum compounds are formed in accordance with the same reaction.

Formation of the compounds in accordance with the above equation involved reacting the pentahalide in a conventional organic solvent in vacuo with the dialkylzinc. The dialkylzinc is added in small increments due to the exothermic character of the reaction. After each addition, the reaction mixture is allowed to warm itself to room temperature while being agitated. After the final addition of the dialkylzinc all of the volatiles are removed and the final product is trapped at a low temperature. Generally, the entire reaction is carried out in a high vacuum system. It is believed that the formulation of the compounds of the invention will be readily understood from the following detailed examples.

Example I

In the formulation of the compounds of the invention, a glass vacuum system was utilized having a 50 milliliter glass bulb as the reaction vessel. The system was initially pumped down to a pressure of $2\times10^{-5}$ mm. Hg before addition of the reactants. Thereafter, the pressure of the system was equal to the sum of the vapor pressures of the volatile materials in the reaction mixture. At the start of the preparation, 7.45 mmoles of $NbCl_5$ and 15 milliliters of pentane as a solvent were supplied in vacuo to the reaction vessel. The reaction vessel was cooled to —78° C. by means of a Dry Ice pack. 18.26 mmoles of dimethylzinc were added to the reaction vessel in small portions because of the exothermic nature of the reaction.

After each portion of the dimethylzinc was added to the reaction vessel, the cooling bath was removed and the reaction mixture was allowed to warm to approximately room temperature and agitated. Upon addition of the final portion of the dimethylzinc, all of the volatile materials in the reaction mixture were removed at room temperature while the desired end product, trimethyldichloroniobium, was trapped at —36° C. The compound was then sublimed from the trap into an analytical ampoule, NMR tube, etc. The yield of trimethyldichloroniobium was 12.7% based on $NbCl_5$ utilized. The trimethyldichloroniobium formed golden yellow crystals which sublimed readily in vacuum at room temperature. The compound darkened and released methane when left at room temperature for several hours. However, the compound was stable indefinitely at —78° C.

The formula of the compound formed in the example was established by hydrolyzing freshly prepared samples in vacuo with aqueous KOH. The resultant methane was measured directly by means of a Sprengel pump. The niobium was determined gravimetrically as the pentoxide. The chloride was also determined gravimetrically. The methane was subsequently shown to be quantitatively pure by means of infrared and mass spectroscopy. All the analytical data were determined independently on the same weighed sample. Additionally, the mass spectrum of the compound indicated a monomeric structure.

Example II

The procedure for forming the niobium compound in Example I was repeated utilizing 4.29 mmoles of tantalum pentachloride and 11.29 mmoles of dimethylzinc and 15 milliliters of pentane. The reaction yielded 0.720 mmoles of trimethyldichlorotantalum. The trimethyldichlorotantalum formed pale yellow crystals of similar volatility to the niobium compound in Example I.

The tantalum compound of this example appeared to be more thermally unstable than the niobium analog. The stabilities of both the niobium and tantalum compounds were adversely affected by small quantities of impurities. Both compounds additionally were highly reactive toward air and water. The formula of the tantalum compound was established by the same means set forth in Example I for establishing the formula of trimethyldichloroniobium.

Example III

To demonstrate the plating ability of the compounds of this invention, films were plated on the inside of a quartz tube. The quartz tube utilized was of a double wall construction and had an outside diameter of 31 millimeters and an inside diameter of 16 millimeters. The surface to be plated was heated by means of a resistive coil heater in vacuo to 700° C. The compound of the invention trimethyldichlorotantalum or trimethyldichloroniobium made in accordance with the previous examples was then admitted at a pressure of less than 1 mm. Hg into the tube. This was accomplished by cooling the compound in a mixture of ice and salt which lowered the vapor pressure to the required value. The material was then passed over the heated surface in the quartz tube in a nonrecirculating flow system for 10 to 12 hours. Volatile pyrolysis products were pumped into the vacuum system and trapped. It was found that the niobium film produced was a superconductor. It was produced like the film from the tantalum compound in a band approximately 20 millimeters wide on the quartz tube. It was found that attempts to speed up the process by changing the pressure did not result in film of equal quality to that produced at pressures less than 1 mm. Hg. The films produced at higher pressures were heavier, flaky and to a degree not adherent in their coating ability.

Example IV

Niobium film was plated on a piece of gold foil in accordance with the above process wherein the foil was heated to approximately 700° C. in vacuo. The gold foil measured 2" x 2" and was covered with a bright uniform niobium mirror. This example demonstrates an important feature of the invention in that it indicates the process utilizing the novel compounds of this invention is applicable to any metal which can be gold plated. Gold was of particular interest in that it was not corrosive, with regard to the hologen containing compounds of the invention.

It has been found that the metal films, resulting from the pyrolysis of the volatile compounds made in accordance with this invention, are plated under much milder conditions than the older processes, depending upon the gas phase reduction of the pentahalides or upon metal evaporation. The flexibility of the invention may be appreciated from the fact that seletced areas in a system may be heated and the metal films will be deposited on these hot spots. Furthermore, it is possible, with this invention, to easily deposit a good, uniform niobium mirror on the inside wall of a tube, something heretofore considered as extremely difficult to do.

What is claimed:

1. Organo-metallic compounds having the general formula:

$$R_3MX_2$$

wherein R is an alkyl group of 1 to 4 C atoms, M is a metal selected from the class consisting of niobium and tantalum, and X is a halogen.

2. $(CH_3)_3TaCl_2$

3. $(CH_3)_3NbCl_2$

4. The method of forming organo-metallic compounds comprising reacting at low temperature under vacuum in an inert solvent a dialkylzinc compound of the formula $R_2Z_n$ with a pentahalide of a metal selected from the class consisting of tantalum and niobium, and recovering a compound of the general formula:

$$R_3MX_2$$

wherein R is an alkyl group of 1 to 4 C atoms, M is a metal selected from the class consisting of niobium and tantalum, and X is a halogen.

5. A method according to claim 4 in which the reaction is conducted at a low temperature of about —78° C. under a vacuum of about $2\times10^{-5}$ mm. Hg vacuum and the compound is recovered at low temperature.

References Cited

Afanasyev Chemistry and Industry (1940), pp. 631–3.

Schrauzer et al. Chemistry and Industry (1959), pp. 540–1.

Gilman et al. J. Am. Chem. Soc., 76 (1954), pp. 3615–17.

TOBIAS E. LEVOW, *Primary Examiner.*

A. P. DEMERS, *Assistant Examiner.*